July 22, 1941.   Y. MATUSITA   2,250,202
CONTROL DEVICE FOR ELECTRIC TRANSLATING APPARATUS
Filed July 19, 1938

Inventor:
Yosio Matusita,
by Harry E. Dunham
His Attorney.

Patented July 22, 1941

2,250,202

UNITED STATES PATENT OFFICE 2,250,202

CONTROL DEVICE FOR ELECTRIC TRANSLATING APPARATUS

Yosio Matusita, Yokohama, Japan, assignor to General Electric Company, a corporation of New York Application July 19, 1938, Serial No. 220,157 In Japan August 17, 1937

17 Claims. (Cl. 171—119)

My invention relates to control devices or excitation circuits for electric valve translating apparatus.

Heretofore there have been devised numerous control devices including electric discharge devices for producing periodic voltages or currents to control associated electric valves. In many circuits, for example in electric resistance welding circuits, it is necessary to control the electric valves to energize a load circuit intermittently or for only a short interval, such as of few cycles of alternating current. The control devices heretofore have been proposed for such purposes are relatively complicated and generate the necessary periodic control voltage by the aid of relatively expensive hot cathode electric discharge devices.

It is an object of my invention to provide a new and improved control device which is simple in arrangement and which can control precisely the associated electric valve translating apparatus by the aid of low priced high vacuum valves such as the commercial valves of small rating instead of using more expensive hot cathode electric valves of large rating.

It is another object of my invention to provide new and improved control devices for electric valve translating apparatus, which can easily, accurately and independently control the current-on and current-off time intervals of the electric valve translating apparatus.

It is a further object of my invention to provide a new and improved electric valve circuit for transmitting energy to a load circuit during an accurately controllable interval of time.

In accordance with the illustrated embodiment of my invention a pair of electric discharge valves are reversely connected in parallel relationship in electric translating apparatus for controlling the flow of current to a welding circuit. According to my invention, I provide a control device including a pair of back-coupled amplifier valves of high vacuum type for generating control voltages of rectangular wave form by the so-called jumping phenomena of the anode voltage to energize the control element or grid of the electric discharge valves to control the flow of current in the welding circuit. A timing circuit is provided to control the operation of the back-coupled amplifier valves in accordance with the electrical conditions of the welding circuit.

Figure 1:
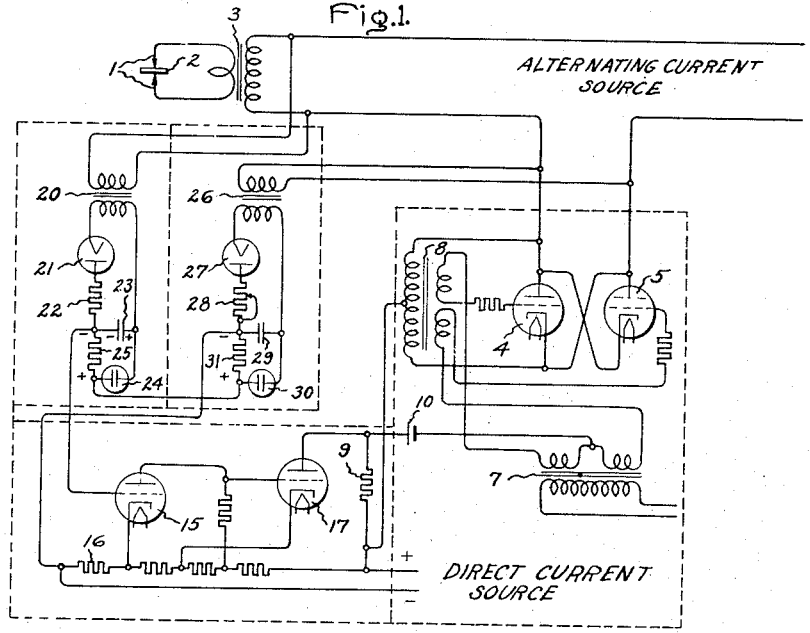
Figure 2:
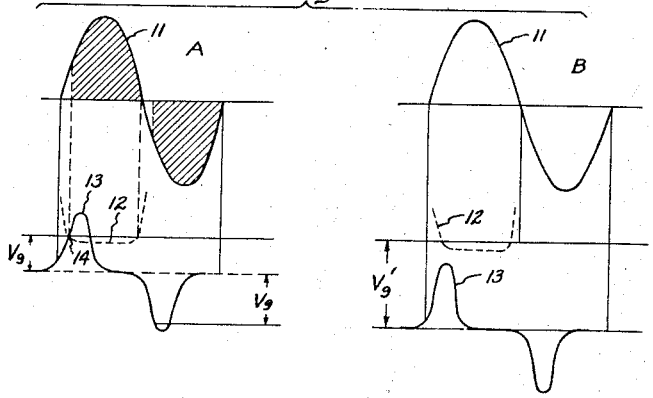
Figure 3:
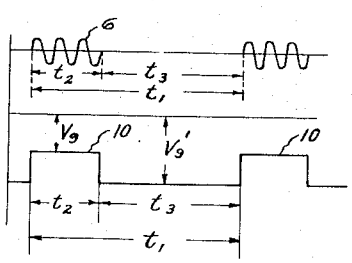
Figure 4:
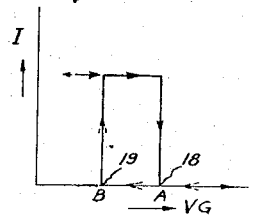
Figure 5:
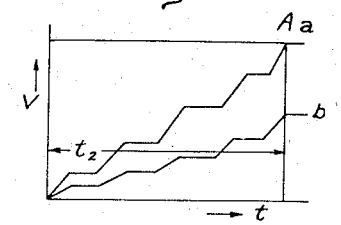

For a better understanding of my invention, reference may be had to the following description taken in connection with the accompanying drawing and its scope will be pointed out in the appended claims. Fig. 1 illustrates diagrammatically one embodiment of my invention as applied to an electric resistance welding device; Figs. 2 and 3 illustrate characteristic curves for explaining the operation of the embodiment of Fig. 1; Fig. 4 is a characteristic curve for explaining the operation of a circuit for generating jumping voltages or voltages of perpendicular wave front; and Fig. 5 shows characteristic curves for explaining the operation of the timing circuit.

Referring to Figure 1 of the drawing, my invention is there diagrammatically illustrated as applied to an electric valve system for energizing a load circuit such as a welding circuit 1 from a suitable source of alternating current through a transformer 3 and electric valve means described hereinafter. Welding electrodes are shown in engagement with the work 2 on which a resistance welding operation, such as seam welding, may be performed. While the electrodes are in engagement with the work, welding current is supplied thereto through the welding transformer 3 from a suitable source of alternating current. In series with the primary winding of the transformer 3, I connect circuit controlling means, such as a pair of electric discharge valves 4 and 5, reversely in parallel, and which are so controlled by their grid potential as to pass welding current of the wave form as shown by curve 6 of Fig. 3. While these valves may be of any kind known to the art, I prefer to use valves of the gas or vapor electric discharge type having an anode, a cathode and an associated control member of the grid or immersion igniter type. In order to provide a source of periodic control potential of the peaked wave form for the valves 4 and 5, there is provided an excitation circuit including a saturable grid transformer 7 which is energized from a suitable source of alternating current correlated in phase and frequency with that energizing the welding transformer, and any suitable phase shifting circuit or device may be connected in the primary circuit of the transformer 7. For the purpose of providing a neutral point through which a common unidirectional grid voltage may be applied to both electric valves 4 and 5, connected reversely in parallel, there is provided a transformer 8 having a primary winding connected across the valve 4 and a pair of secondary windings each connected to the control grid of the valves 4 and 5, the neutral point of the primary winding of the transformer 8 being connected to a terminal of a resistance 9 across which a unidirectional grid biasing voltage is produced as will be fully explained hereinafter. Between the other terminal of the resistance 9 and the neutral point of the secondary winding of the grid transformer 7 is connected a suitable source 10 of negative grid biasing potential. With this connection a grid voltage which is the resultant of the voltage drop across the resistance 9, unidirectional voltage derived from the source 10 and the peak wave voltage induced in the secondary winding of the transformer 7 is impressed on the grids of the valves 4 and 5 for rendering them conductive during the successive half cycles. The insertion of the transformer 8 does not cause any change in the grid voltage because the voltages introduced in the grid circuit by the primary and secondary windings of the transformer 8 cancel each other.

In order to obtain a welding current as shown by the curve 6 of Fig. 3, it is necessary and sufficient to produce a rectangular voltage across the resistance 9 as shown by the curve 10 of the same figure. Referring now to Fig. 2, curve 11 indicates the anode voltage of the valves 4 and 5, and the curve 12 shows a critical grid starting voltage with respect to the anode voltage shown. If the voltage drop across the resistance 9 is represented by $V_g$ in Fig. 2A, the resultant grid voltage which is the sum of this voltage $V_g$ and the secondary voltage 13 of the transformer 7 would intersect with the grid starting voltage curve 12 at a point 14 so that the valve 4 would start conducting from this point, the valve 5 would also start conducting with the same lagging angle of phase as the valve 4. However, if the voltage drop across the resistance 9 increases to $V_g'$ of Fig. 2B, the resultant of the voltage $V_g'$ and the voltage 13, that is the grid voltage of the valves would not intersect with the curve 12 at all, so that the valves would not be rendered conductive. Thus, if it is possible to maintain the voltage drop across the resistance 9 at $V_g$ for the time interval $t_2$ during every definite interval $t_1$ as shown in Fig. 3, the valve current would flow during the time interval $t_2$ and would be interrupted during the time interval $t_3$. Accordingly it will be sufficient if it is possible to simply obtain the rectangular voltage 10 and to regulate at will the time intervals $t_1$ and $t_2$.

In accordance with my invention, I use the so-called high vacuum valves instead of using the hot cathode electric valves of large rating as heretofore has been the practice for producing this rectangular voltage 10, and the whole arrangement is made simple and of low cost by utilizing the jumping phenomena of the anode voltage due to the back-coupling of these valves. In order to produce a suitable control voltage of perpendicular wave front of predetermined duration I provide electronic discharge amplifier valves 15 and 17 which are back-coupled together for producing this jumping phenomena, and resistance 16 is a grid biasing resistance energized from a suitable source of direct current. These elements constitute a back-coupled amplifier device having the resistance 16 as the back-coupling resistance. The relation between the grid voltage VG of the valve 15 and the anode current I of the valve 17 passing through the resistance 9 is as follows: The current I jumps at a predetermined value of VG to produce hysterisis phenomena as shown in Fig. 4. More specifically, when the voltage VG is increased in the more positive direction, the current I would decrease to zero at the point 18 and remain at this value as indicated by the full line arrow, and when the voltage VG is subsequently decreased, the current would remain at zero even if it has passed over the point 18 until it jumps at the point 19 as shown by the dotted line arrow.

Since this jumping is completed within a very short interval of time, it will be clear that positive or negative impulse of extremely short interval impressed on the grid of the valve 15 is sufficient to cause this jumping phenomena.

As already mentioned, the circuit for producing the jumping phenomena is a kind of back-coupled amplifier circuit, wherein a portion of the voltage amplified by the discharge valves 15 and 17 is fed back to the grid of the valve 15 through the back-coupling resistance 16. Due to the too close back-coupling, the amplification constant would become infinite to create an unstable point, thereby producing the so-called jumping phenomena. By increasing the grid voltage of the valve 15 above a certain value in the positive direction, the current through the valve 15 will increase, and the grid of the valve 17 will be biased more negatively to decrease the anode current thereof. Accordingly, the voltage drop across the resistance 16 will also decrease to cause the decrease in the negative grid voltage of the valve 15. As the result of this the current passing through the valve 15 will increase to decrease the anode current of the valve 17 until it is reduced to zero. On the contrary the jumping phenomena is also produced when the grid voltage of the valve 15 is made more negative, but in this case, the jumping phenomena would not be produced unless the grid bias voltage is made more negative than that of point 18 as the grid biasing potential has been shifted in the positive direction by the preceding jumping phenomena. Such jumping current will produce a voltage drop of the rectangular wave form 10 as shown in Fig. 3 across the resistance 9.

In accordance with my invention, I provide the following circuits for adjusting the current-on time interval $t_2$ and current-off time interval $t_3$. A rectifier 21 of a suitable type is connected across the primary winding of the welding transformer 3 through a transformer 20 for charging a condenser 23 through a series resistance 22. Connected in parallel with the condenser 23 is an electric discharge valve which breaks down at a definite voltage, for instance, a neon tube 24, whereby the neon tube discharges at a definite terminal voltage of the charged condenser 23 to produce a voltage drop across a resistance 25 connected in series with the tube, and this negative impulse voltage is impressed upon the grid of the amplifier valve 15. The rectifier 21 passes unidirectional current so long as the welding current is flowing through the welding transformer 3 to charge the condenser 23. Thus the condenser is charged up step by step during the every positive half cycle of the welding current as shown in Fig. 5, the rate of charge or the interval $t_2$ can be regulated as desired by means of the series resistance 22. Therefore, if it is assumed that the condenser discharges after the time interval $t_2$ taking the instant at which the welding current begins to flow as the origin, the voltage drop across the resistance 25 due to the discharge current will be impressed upon the grid of the amplifier valve 15 to interrupt the current therethrough. Since the interval $t_2$ is the time necessary for charging the condenser 23 up to a predetermined discharging voltage, it will be clear that the time interval $t_2$ can be regulated by the resistance 22. Thus the rectifier 21 and the associated equipment provide a control voltage which determines the period of time during which electric valves 4 and 5 are conductive to effect energization of the welding circuit 1 during a corresponding interval of time.

In order to regulate the current-off time interval $t_3$, the fact that the voltage of the source is impressed across the anode terminals of the discharge valves 4 and 5 is utilized and this voltage is rectified to charge a condenser which is arranged to be discharged after the time interval $t_3$ for impressing a positive impulse voltage upon the grid of the valve 15. For this purpose, I connect a transformer 26 between the anodes of the discharge valves 4 and 5 for charging a condenser 29 by a rectifier 27 through a series resistance 28. An electric discharge valve which breaks down at a definite voltage, such as a neon tube 30, is connected in series with a resistance 31 across the condenser 29 so that the voltage drop across the resistance 31 may be impressed on the grid of the valve 15 in the positive direction. By this arrangement the current-off time interval $t_3$ may be regulated just in the same manner as the interval $t_2$.

The general operation of the present device as above explained is as follows: When the transformer 3 is connected to a suitable source of alternating current after properly setting the resistances 22 and 28, the valves 4 and 5 will operate alternately to supply alternating current to the transformer 3. In this case the transformer 26 is short circuited by the discharge valve 4 or 5 so that the rectifier 27 does not operate. The transformer 20, however, is energized and supplies alternating voltage to the rectifier 21 for charging the condenser 23. After the condenser 23 has received a predetermined number of half cycles of alternating current determined by the setting of the series resistance 22, the voltage of the condenser 23 reaches a predetermined value to discharge the neon tube 24. Thus a high negative impulse voltage is produced across the resistance 25, which is impressed upon the grid of the amplifier valve 15 to decrease the current therethrough, which in turn causes an increase in the anode current of the valve 17 for producing a large voltage drop $V_{g'}$ across the resistance 9. This increased voltage drop $V_{g'}$ is then impressed upon the grids of the valves 4 and 5 to render them non-conductive. Then the transformer 20 will no more be subjected to alternating voltage and only the transformer 26 will be energized to charge the condenser 29 through the rectifier 27. When the condenser has been charged up to a definite voltage during the time interval $t_3$ which is determined by the setting of the resistance 28, the neon tube 30 will discharge to produce a positive impulse voltage across the resistance 31, which effects increase in the current through the valve 15, and thus decreasing the anode current through the valve 17. Therefore the resistance drop across the resistance 9 is reduced to $V_g$ and the valves 4 and 5 are again rendered conductive. Thus the periodic welding current as shown by the curve 6 of Fig. 3 can be obtained.

When it is desired to use my control device as the control circuit for a spot welding apparatus, the control circuit for the current-off time interval may be omitted and a suitable switch for giving a negative impulse at any desired instance may be substituted.

Electric discharge valves 15, 17, 21 and 27 provided in accordance with my invention may be small vacuum valves of small electrical rating. The high vacuum valves are cheap and consume a relatively small amount of electric power. Moreover, since I use neon tubes 24 and 30 for controlling time intervals $t_2$ and $t_3$, timing control can be effected more precisely and the current-on time interval $t_2$ and current-off time interval $t_3$ can be advantageously regulated independently to each other.

While I have shown a particular embodiment of my invention in connection with an electric resistance welding device, it will be understood, of course, that I do not wish to be limited thereto since many modifications may be made, and I therefore contemplate by the appended claims to cover any such modifications as fall within the true spirit and scope of my invention.

What I claim as new and desire to secure by Letters Patent of the United States is:

1. In combination a source of alternating current, a load circuit, an electric valve translating apparatus provided with a control element and interconnecting said source and said load circuit, a pair of back-coupled amplifier valves which produces a voltage of rectangular wave form, a connection for impressing said voltage of rectangular wave form upon said control element of the electric valve translating apparatus, and means responsive to an electrical condition of said translating apparatus for controlling the operation of said back-coupled amplifier valves to effect control of the period of energization of said load circuit.

2. In combination, an alternating current circuit, a load circuit, an electric valve device including a control element for supplying current of a predetermined number of cycles of current from said alternating current circuit to said load circuit at predetermined intervals of time, a back-coupled amplifier circuit for producing a control voltage for said electric valve device due to the jumping phenomena, and means for controlling said jumping phenomena of the back-coupled amplifier circuit and comprising a control circuit for the current-on time interval which produces a negative impulse voltage when current has been transmitted during a predetermined number of cycles and a second control circuit for the current-off time interval which produces a positive impulse voltage a predetermined interval of time after the interruption of the current.

3. In combination, an alternating current supply circuit, a load circuit, an electric valve translating apparatus connected between said circuits for effecting energization of said load circuit for a predetermined interval of time and comprising a control element, and an excitation circuit for impressing on said control member a periodic voltage of rectangular wave form and comprising a pair of high vacuum amplifier valves back-coupled through a common back-coupling resistance, means for controlling the conductivity of one of said amplifier valves in accordance with an electrical condition of said alternating current supply circuit and means for energizing said control element in accordance with the variation in magnitude of the anode current of the other amplifier valve.

4. In combination a welding transformer, an electric valve in series with the primary winding of said welding transformer, a back-coupled amplifier valves arranged to produce a jumping phenomena for controlling the conductivity of said electric valve, a control circuit for impressing a negative impulse voltage upon the control electrode of said amplifier valves, comprising a condenser arranged to be charged by a unidirectional current through a series variable resistance, a rectifier for rectifying the alternating voltage across the primary winding of said welding transformer for producing said unidirectional current, and a neon tube which is connected in parallel with said condenser and discharges at a predetermined condenser voltage to produce said negative impulse voltage across a resistor connected in series with said neon tube.

5. In combination a welding transformer, a pair of electric valves, reversely connected in parallel, in series with the primary winding of said welding transformer, a back-coupled amplifier device for controlling the conductivity of said electric valves, and a control circuit for controlling the interval of time during which said pair of electric valves are rendered non-conductive, including a rectifier for rectifying voltage across the anodes of said electric valves, a condenser arranged to be charged by said rectifier through a series variable resistance, a neon tube which is connected in parallel with said condenser and discharges at a predetermined condenser voltage to produce a positive impulse voltage across a resistance connected in series of said neon tube, and a circuit for impressing said positive impulse voltage upon the control electrode of said back-coupled amplifier device.

6. In combination, an alternating current circuit, a load circuit, electric valve means connected between said circuits for transmitting power therebetween and having a control member for controlling the conductivity thereof, an excitation circuit for energizing said control member to effect periodic energization of said load circuit, means energized from said alternating current circuit for introducing into said excitation circuit a voltage to determine the interval of time between periodic energizations of said load circuit, and means connected across said load circuit to determine the length of each period of energization of said load circuit.

7. In combination, an alternating supply circuit, a load circuit, electric translating apparatus connected between said circuits and comprising a transformer and a pair of reversely connected electric valve means connected between said supply circuit and said transformer, said electric valve means each having a control member for controlling the conductivity thereof, an excitation circuit for energizing the control member and tending to render said electric valve means conductive periodically and comprising means for producing a periodic voltage and means for producing a variable unidirectional control potential, means connected across said electric valve means for introducing into said excitation circuit a voltage to determine the interval of time between successive energizations of said load circuit, and means connected across said transformer for introducing into said excitation circuit a voltage to determine the length of the periods of energization of said load circuit.

8. In combination, an alternating current supply circuit, a load circuit, electric translating apparatus connected between said circuits for effecting periodic recurrent energization of said load circuit and comprising a transformer and a pair of reversely connected electric valve means connected between said supply circuit and said transformer, said electric valve means each having a control member for controlling the conductivity thereof, an excitation circuit for energizing the control members to render said electric valve means conductive alternately during predetermined recurrent intervals of time and comprising a resistance and an electronic discharge device for transmitting variable amounts of unidirectional current through said resistance to control the resultant voltage impressed on the control members, means connected across said electric valve means for controlling said electronic discharge device to determine the time interval between successive periods of energization of said load circuit, and means connected across said transformer for controlling said electronic discharge device to determine the length of the periods of energization of said load circuit.

9. In combination, an alternating current supply circuit, a load circuit, electric translating apparatus connected between said circuits and comprising electric valve means having a control member for controlling the conductivity thereof, and an excitation circuit for energizing said control member comprising a resistance, a source of direct current, a back-coupled amplifier including a pair of electronic discharge devices for transmitting variable amounts of unidirectional current through said resistance to produce a periodic control voltage of rectangular wave form, and means energized from said alternating current circuit for controlling the conductivities of one of said electronic discharge devices.

10. In combination, an alternating current supply circuit, a load circuit, electric translating apparatus connected between said circuits for effecting periodic energization of said load circuit and comprising electric valve means having a control member for controlling the conductivity thereof, an excitation circuit for energizing said control member and comprising a resistance, a source of direct current, a back-coupled amplifier including a pair of electronic discharge devices for transmitting variable amounts of current through said resistance to produce a periodic voltage of rectangular wave form, said electronic discharge devices each being provided with a control grid, and means for energizing the control grid of one of said electronic discharge devices comprising a circuit responsive to the voltage across said electric valve means and a circuit responsive to an electrical condition of said load circuit.

11. In combination, an alternating current supply circuit, a load circuit, electric translating apparatus connected between said circuits for effecting periodic energization of said load circuit and including electric valve means having a control member, an excitation circuit for energizing said control member comprising a resistance, a source of direct current, and a back-coupled amplifier including a pair of electronic discharge devices for transmitting variable amounts of unidirectional current from said source through said resistance to produce a periodic control voltage of rectangular wave form, said electronic discharge devices each comprising an anode, a cathode and a control grid, means connected between the anode-cathode circuit of one of said electronic discharge devices to impress a voltage on the grid of the other discharge device to control the anode-cathode current thereof inversely with respect to the anode-cathode current conducted by said one discharge device, and a circuit for energizing the grid of said one discharge device comprising means responsive to the voltage appearing across said electric valve means to produce a positive periodic control voltage and means responsive to an electrical condition of said load circuit for producing a negative periodic voltage.

12. In combination, a source of current, a load circuit, circuit controlling means connected between said source and said load circuit for effecting periodic energization of said load circuit, means responsive to an electrical condition of said load circuit for determining the duration of the periods of energization of said load circuit, and means responsive to the voltage across said circuit controlling means for controlling the interval of time between the periodic energizations of said load circuit.

13. In combination, a source of current, a load circuit, circuit controlling means connected between said load circuit and said source for effecting a periodic energization of said load circuit, control means for said circuit controlling means, means responsive to an electrical condition of said load circuit for controlling said control means to determine the duration of the periods of energization of said load circuit, and means for controlling said control means to determine the interval of time between the periodic energizations of said load circuit.

14. In combination, a source of current, a load circuit, circuit controlling means connected between said source and said load circuit for effecting periodic energization thereof, control means for said circuit controlling means, and a circuit for determining the duration of the periods of energization of said load circuit and the interval of time between the periodic energizations of said load circuit comprising means responsive to an electrical condition of said load circuit for producing a control voltage, means responsive to the voltage across said circuit controlling means for producing a second control voltage and means responsive to said control voltages for controlling the energization of said control means.

15. In combination, a source of current, a load circuit, circuit controlling means connected between said source and said load circuit for effecting periodic energization thereof, and means for controlling said circuit controlling means to determine the interval of time between the periodic energizations of said load circuit comprising a capacitance, a rectifier responsive to the voltage across said circuit controlling means for charging said capacitance and means responsive to the voltage of said capacitance for initiating discharge of said capacitance after the lapse of a predetermined interval of time.

16. In combination, an alternating current supply circuit, a load circuit, electric valve means connected between said supply circuit and said load circuit for effecting periodic energization of said load circuit and comprising a control member for controlling the conductivity thereof, and means for energizing said control member to determine the duration of the periods of energization of said load circuit and for determining the interval of time between the periodic energizations of said load circuit comprising a circuit responsive to an electrical condition of said load circuit for producing a control voltage, a circuit responsive to the voltage appearing across said electric valve means for producing a second control voltage and means responsive to a resultant of said control voltages for impressing on said control member a periodic voltage.

17. In combination, a load circuit, circuit controlling means connected between said source and said load circuit for effecting periodic energization thereof, and means responsive to the voltage appearing across said circuit controlling means to determine the interval of time between the periodic energizations of said load circuit.

YOSIO MATUSITA.